(12) United States Patent
Tamaki et al.

(10) Patent No.: US 12,544,866 B2
(45) Date of Patent: Feb. 10, 2026

(54) SHRINK FITTING SYSTEM

(71) Applicant: Konica Minolta, Inc., Tokyo (JP)

(72) Inventors: Katsuaki Tamaki, Hamamatsu (JP); Yasuhiro Matsumoto, Okazaki (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/684,219

(22) PCT Filed: Jun. 1, 2022

(86) PCT No.: PCT/JP2022/022351
§ 371 (c)(1),
(2) Date: Feb. 16, 2024

(87) PCT Pub. No.: WO2023/021810
PCT Pub. Date: Feb. 23, 2023

(65) Prior Publication Data
US 2024/0359275 A1    Oct. 31, 2024

(30) Foreign Application Priority Data

Aug. 20, 2021 (JP) .................................. 2021-134980

(51) Int. Cl.
*B23P 11/02* (2006.01)
*B23B 31/117* (2006.01)
(Continued)

(52) U.S. Cl.
CPC ......... *B23P 11/027* (2013.01); *B23B 31/1179* (2013.01); *B23P 19/12* (2013.01);
(Continued)

(58) Field of Classification Search
CPC ....... B23P 11/027; B23P 19/105; B23P 19/12; B23B 31/1179; B23B 2240/28; B23Q 3/15513; B23Q 3/1554
See application file for complete search history.

(56) References Cited

U.S. PATENT DOCUMENTS 3,824,674 A     7/1974   Takeyasu et al.
3,984,006 A  *  10/1976  Takeyasu ................ B23P 19/12
                                                                414/730
(Continued)

FOREIGN PATENT DOCUMENTS

JP      S49101973 A    9/1974
JP      2005066772 A   3/2005
(Continued)

OTHER PUBLICATIONS

Translation of JP2005066772 (Year: 2005).*
(Continued)

*Primary Examiner* — Matthew P Travers
(74) *Attorney, Agent, or Firm* — Buchanan Ingersoll & Rooney PC

(57) ABSTRACT

A task of insertion of a tool is continued even when the insertion of the tool is failed in a shrink fitting method. A shrink fitting system for shrink-fitting a tool to a holder includes: a heating device that heats the holder; an insertion device that inserts the tool into the heated holder; and a control device for the shrink fitting system. The insertion device includes a sensor that detects a failure of insertion of the tool into the holder. Based on the failure of the insertion of the tool into the holder being detected, the control device performs at least one of outputting, to the insertion device,
(Continued)

a command for adjusting an insertion position of the tool or for replacing the tool and outputting, to the heating device, a command for re-heating the holder.

20 Claims, 10 Drawing Sheets

(51) Int. Cl.
 *B23P 19/12* (2006.01)
 *B23Q 3/155* (2006.01)
(52) U.S. Cl.
 CPC ...... *B23B 2240/28* (2013.01); *B23Q 3/15513* (2013.01); *B23Q 3/1554* (2013.01)

(56) References Cited

U.S. PATENT DOCUMENTS

| | | | | |
|---|---|---|---|---|
| 4,782,274 | A * | 11/1988 | Teegarden | B23P 19/105 |
| | | | | 901/30 |
| 6,216,335 | B1 * | 4/2001 | Freyermuth | B23P 11/027 |
| | | | | 29/800 |
| 6,408,531 | B1 * | 6/2002 | Schimmels | B25J 17/0208 |
| | | | | 33/644 |
| 6,629,480 | B1 * | 10/2003 | Freyermuth | B23P 11/027 |
| | | | | 33/201 |
| 2010/0051610 | A1 * | 3/2010 | Wittels | B23P 11/027 |
| | | | | 29/800 |

FOREIGN PATENT DOCUMENTS

| | | |
|---|---|---|
| JP | 2005118888 A | 5/2005 |
| JP | 2005313264 A | 11/2005 |
| JP | 2009107026 A | 5/2009 |

OTHER PUBLICATIONS

Translation of JP2009107026 (Year: 2009).*
Translation of JPS49101973 (Year: 1974).*
Written Opinion of the International Searching Authority (Forms PCT/ISA/237 and PCT/ISA/210) issued on Jul. 5, 2022, by the Japan Patent Office (ISA/JP), in corresponding International Application No. PCT/JP2022/022351. (13 pages).
Japanese Office Action dated Dec. 9, 2025, issued in Japanese Patent Application No. 2023-542230, with English translation; 8 pages.

\* cited by examiner

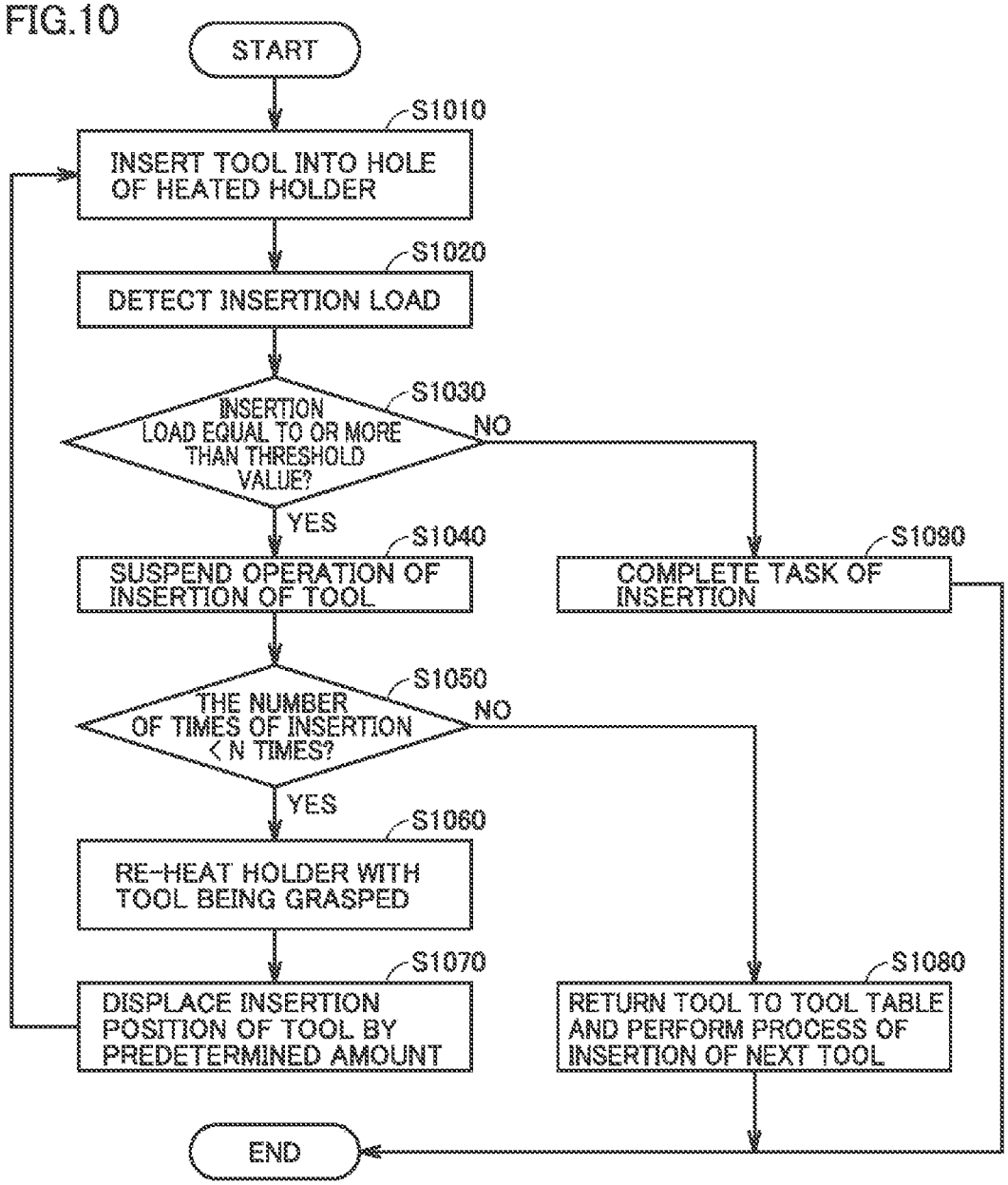

SHRINK FITTING SYSTEM

TECHNOLOGICAL FIELD

The present disclosure relates to a shrink fitting system, more particularly, to control of insertion of a tool into a holder.

BACKGROUND

A computer numerical control (CNC) processing machine such as a machining center can perform various types of processing on a member by replacing a holder in which tools are inserted. Each tool needs to be inserted in the holder in advance before use. An exemplary method of inserting the tool is shrink fitting by which a tool is inserted into a holder that is heated and expanded.

Regarding insertion of a tool into a holder, for example, Japanese Laid-Open Patent Publication No. 2005-66772 (Patent Literature 1) discloses "an attachment device for a tool or the like, which can safely, quickly and surely fit and position the tool or the like in a predetermined position of the holder in any direction". In the attachment device, a holder support portion is constituted of: a fitting projection that fits in a negative pressure forming portion so as to support the holder on the holder support portion: a gas suction portion that is provided to extend through the fitting projection and that releases air or gas in the negative pressure forming portion: and a positioning portion constituted of a pin to which the tool or the like inserted in an insertion portion for the tool or the like comes into contact to position the tool or the like at its contact position (see [Abstract]).

CITATION LIST

Patent Literature

Patent Literature 1: Japanese Laid-Open Patent Publication No. 2005-66772

SUMMARY

Technical Problem

According to the technique disclosed in Patent Literature 1, when the insertion of the tool is failed in the shrink fitting method, a task of insertion of the tool cannot be continued. Therefore, there has been required a technique for continuing the task of insertion of the tool even when the insertion of the tool is failed in the shrink fitting method.

The present disclosure has been made in consideration of the above-described background, and an object in a certain aspect is to provide a technique for continuing a task of insertion of a tool even when the insertion of the tool is failed in the shrink fitting method.

Solution to Problem

According to a certain embodiment, a shrink fitting system for shrink-fitting a tool to a holder is provided. The shrink fitting system includes: a heating device that heats the holder; an insertion device that inserts the tool into the heated holder; and a control device for the shrink fitting system. The insertion device includes a sensor that detects a failure of insertion of the tool into the holder. Based on the failure of the insertion of the tool into the holder being detected, the control device performs at least one of outputting, to the insertion device, a command for adjusting an insertion position of the tool or for replacing the tool and outputting, to the heating device, a command for re-heating the holder.

In a certain aspect, the insertion device includes an elastic portion that is shrunk in response to a pressure applied to the tool. The sensor is configured to change a signal to be output from the sensor, based on the elastic portion being shrunk by a predetermined distance or more.

In a certain aspect, the sensor is a photo sensor. The insertion device further includes a shielding object for the sensor, and based on the elastic portion being shrunk by the predetermined distance or more, the shielding object is configured to block an incoming light path for the sensor or be separated from the incoming light path for the sensor.

In a certain aspect, the elastic portion has an elastic modulus with which the elastic portion is shrunk at a pressure lower than a pressure at which the shrink fitting system stops an operation of the insertion of the tool.

In a certain aspect, the insertion device detects, by the sensor, a failure of a task of the insertion of the tool before a pressure between the tool and the holder becomes a predetermined force.

In a certain aspect, the sensor is disposed in a vicinity of the elastic portion.

In a certain aspect, the control device performs replacing the tool based on the failure of the insertion into the holder being detected a predetermined number of times after performing at least one of adjusting the insertion position of the tool and re-heating the holder.

In a certain aspect, the insertion device suspends an operation of the insertion based on a load applied to the insertion device being detected by the sensor to become equal to or more than a predetermined force.

In a certain aspect, the adjusting of the insertion position of the tool includes separating the tool from the holder, displacing the insertion position of the tool by a predetermined displacement amount, and re-inserting the tool into the holder.

In a certain aspect, the insertion device performs the adjusting to position a center of the tool on an inner side with respect to an outer periphery of a taper of the holder.

In a certain aspect, the insertion device includes an alignment mechanism that adjusts the insertion position of the tool along a taper of the tool and the taper of the holder.

In a certain aspect, the control device determines that a task of the insertion is succeeded, based on the tool being inserted into the holder by a first amount without detecting the failure of the insertion of the tool into the holder.

In a certain aspect, the insertion device causes free fall of the tool based on the tool being inserted into the holder by a second amount.

In a certain aspect, the shrink fitting system further includes a pedestal for the holder. The pedestal includes a first positioning member that determines a fixing position of the holder.

In a certain aspect, the pedestal further includes a second positioning member that determines the insertion position of the tool.

In a certain aspect, the second positioning member is drivable in an insertion direction of the tool. The control device adjusts a height of the second positioning member in accordance with a type of the tool.

Advantageous Effects of Invention

According to a certain embodiment, it is possible to continue a task of insertion of a tool even when the insertion of the tool is failed in the shrink fitting method.

The foregoing and other objects, features, aspects and advantages of the disclosure will become more apparent from the following detailed description of the present disclosure when taken in conjunction with the accompanying drawings.

BRIEF DESCRIPTION OF THE DRAWINGS

FIG. 10 is a diagram illustrating an exemplary operation sequence of the shrink fitting system 100.

DETAILED DESCRIPTION OF EMBODIMENTS

Figure 1:
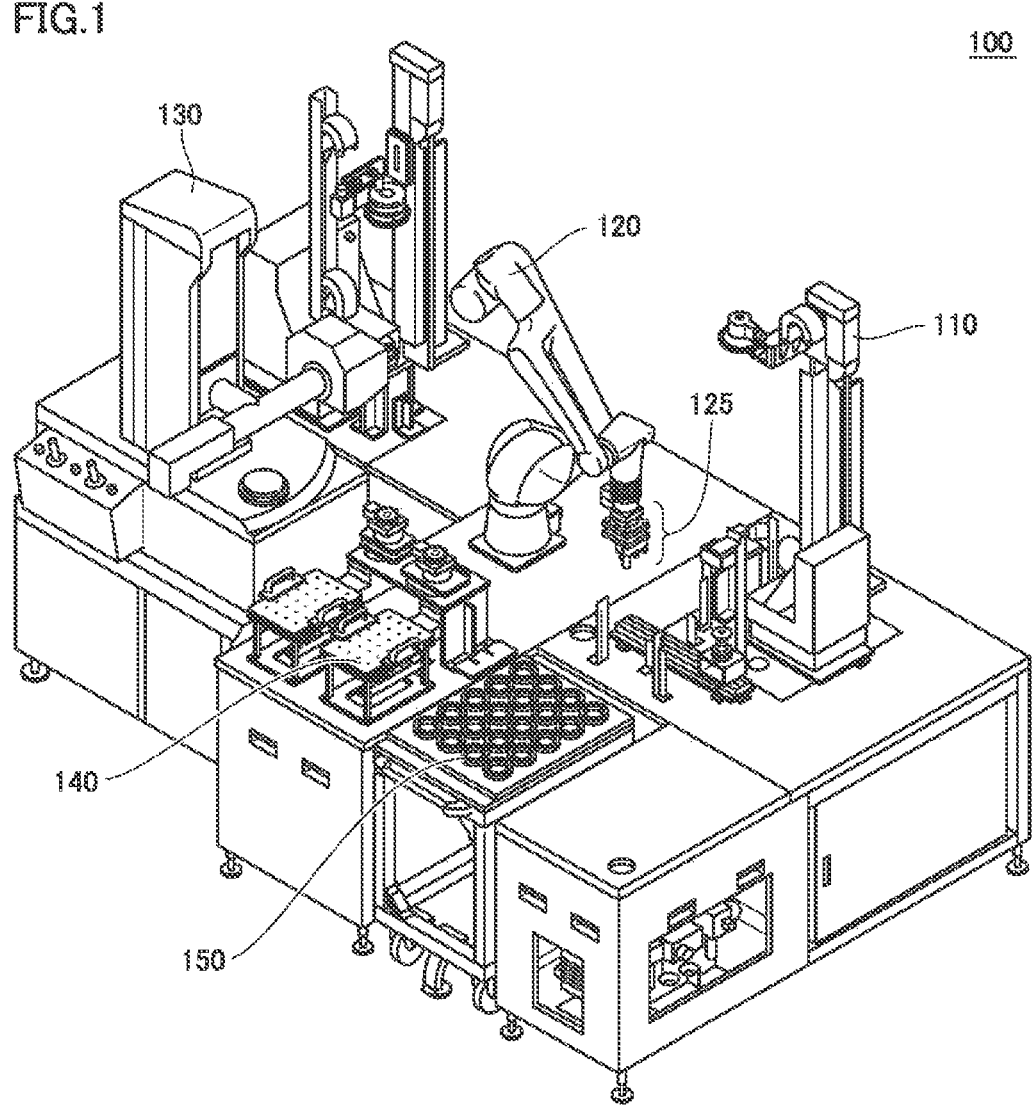
FIG. 1 is a diagram illustrating an exemplary bird's eye view of a shrink fitting system 100 according to a certain embodiment.

Hereinafter, an embodiment of a technical idea according to the present disclosure will be described with reference to figures. In the following description, the same components are denoted by the same reference characters. Their names and functions are also the same. Therefore, detailed description thereof will not be repeated.

Figure 2:
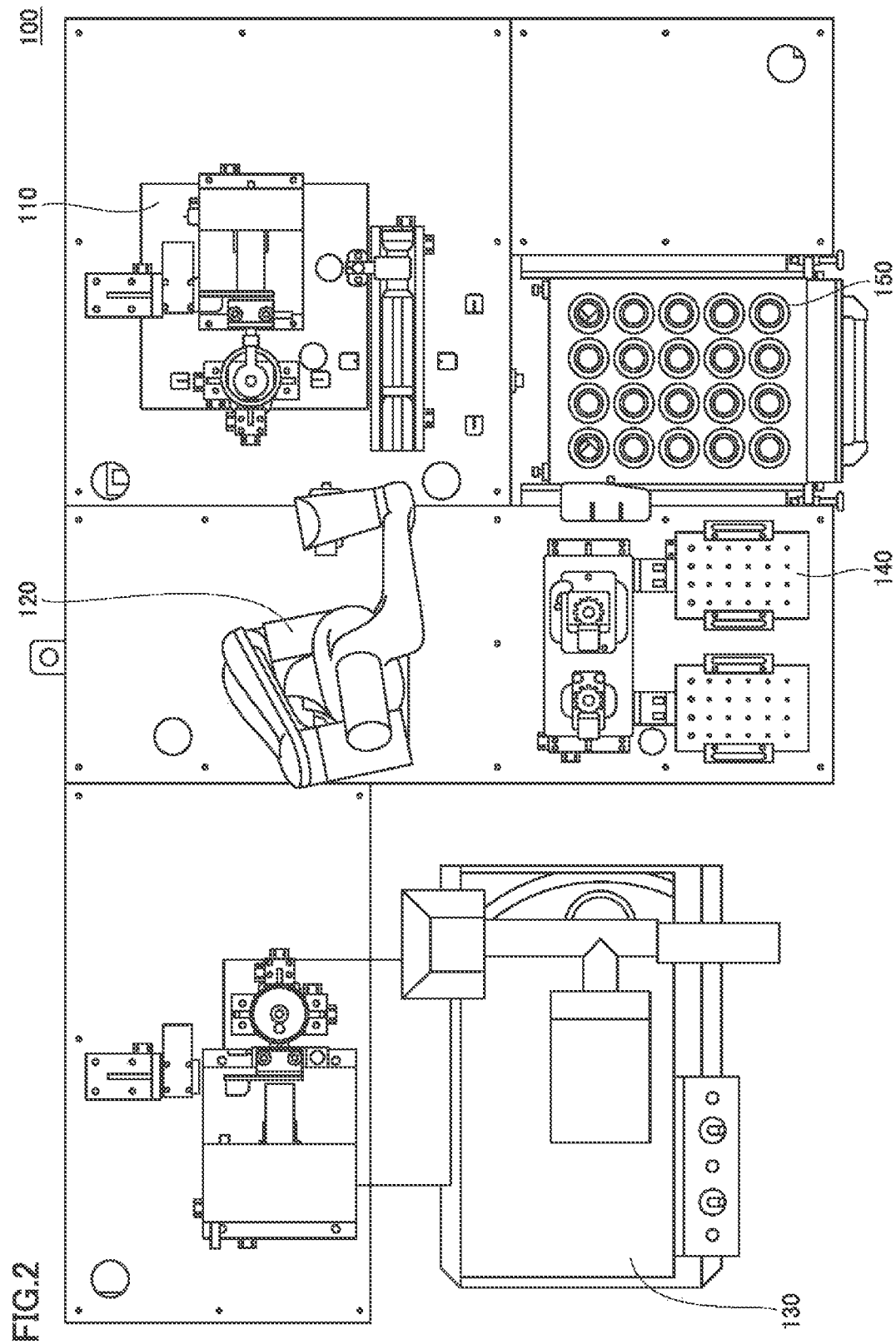
FIG. 2 is a diagram illustrating an exemplary top view of the shrink fitting system 100 according to the embodiment.

FIG. 1 is a diagram illustrating an exemplary bird's eye view of a shrink fitting system 100 according to the present embodiment. FIG. 2 is a diagram illustrating an exemplary top view of the shrink fitting system 100 according to the present embodiment. With reference to FIGS. 1 and 2, main configurations of the shrink fitting system 100 according to the present embodiment will be described. As the main configurations, the shrink fitting system 100 includes a heating device 110, a robot 120, a preset tool 130, a tool table 140, and a holder installation table 150. The robot 120 includes a front end tool 125 that is attachable and detachable.

Furthermore, the shrink fitting system 100 includes, inside or outside of its housing, a device 900 (see FIG. 9) that controls the shrink fitting system 100. In a certain aspect, when the device 900 is located outside the housing of the shrink fitting system 100, the device 900 can be connected to the shrink fitting system 100 via a network.

The shrink fitting system 100 uses these configurations so as to shrink-fit a tool 310 (see FIG. 3), which is usable in a CNC processing machine or the like, into a holder 320 (see FIG. 3) attached to the CNC processing machine or the like. The shrink fitting system 100 automatically and continuously performs a task of shrink-fitting the tool 310 to the holder 320.

The heating device 110 heats the holder 320 to expand a hole 325 (see FIG. 3) of the tool 310 provided in the holder. The holder 320 is installed by the robot 120 from the holder installation table 150 or the like onto a pedestal 410 (see FIG. 4) disposed in the vicinity of the heating device 110, for example.

The robot 120 acquires the tool 310 on the tool table 140 and inserts the tool 310 into the hole 325 of the heated holder 320. Since the robot 120 grasps the tool 310 and inserts it into the holder 320, it can be also said that the robot 120 is a grasping device or insertion device for the tool 310. In a certain aspect, the robot 120 may have a function of acquiring the holder 320 from the holder installation table 150 or the like and disposing the holder 320 on the pedestal 410 of the heating device 110.

The front end tool 125 includes a mechanism for grasping the tool 310 and inserting the tool 310 into the holder 320. Since a difference between the tool diameter of the tool 310 and the diameter of the hole 325 of the holder 320 is very small, the robot 120 is required to perform repetitive tasks with high precision. However, it is difficult for the robot 120 to completely satisfy the required precision, and the task of insertion of the tool 310 may be failed due to displacement of the insertion position of the tool 310. A conventional shrink fitting system or shrink fitting device is forcibly stopped when the task of insertion of the tool 310 is failed, and cannot continue the shrink-fitting task. Therefore, front end tool 125 according to the present embodiment includes a sensor and a mechanism so as to detect the failure of the task of insertion of tool 310, and suspend and resume the task of insertion of tool 310. Details of the front end tool 125 will be described with reference to FIGS. 5 and 6.

The preset tool 130 acquires information such as tool length, tool diameter, and the like of the tool 310 inserted in the holder 320. The tool length may be, for example, a distance from the front end of the holder 320 to the front end of the tool 310. The tool diameter is a diameter of the tool 310. These pieces of information can be used for offset setting, setting of rotation speed, and the like of the tool 310 in the CNC processing machine.

The tool table 140 is a table on which tools 310 to be inserted into the holder 320 are arranged. The types of the tools 310 arranged on the tool table 140 do not need to be the same, and the tool table 140 is configured such that a plurality of types or plurality of sizes of tools 310 can be installed thereon.

The holder installation table 150 is a table for installing the holder 320 having the tool 310 inserted therein. In a certain aspect, the holder installation table 150 may also serve as an installation table for the holder 320 before the tool 310 is inserted. In another aspect, the shrink fitting system 100 may include an installation table for the holder 320 before the tool 310 is inserted, in addition to the holder installation table 150. In this case, the robot 120 transports the holder 320 to the pedestal 410 of the heating device 110 from the installation table for the holder 320 before the tool 310 is inserted.

The heating device 110, the robot 120, the preset tool 130, and the like can be controlled by the device 900 to operate in cooperation with one another.

Figure 3:
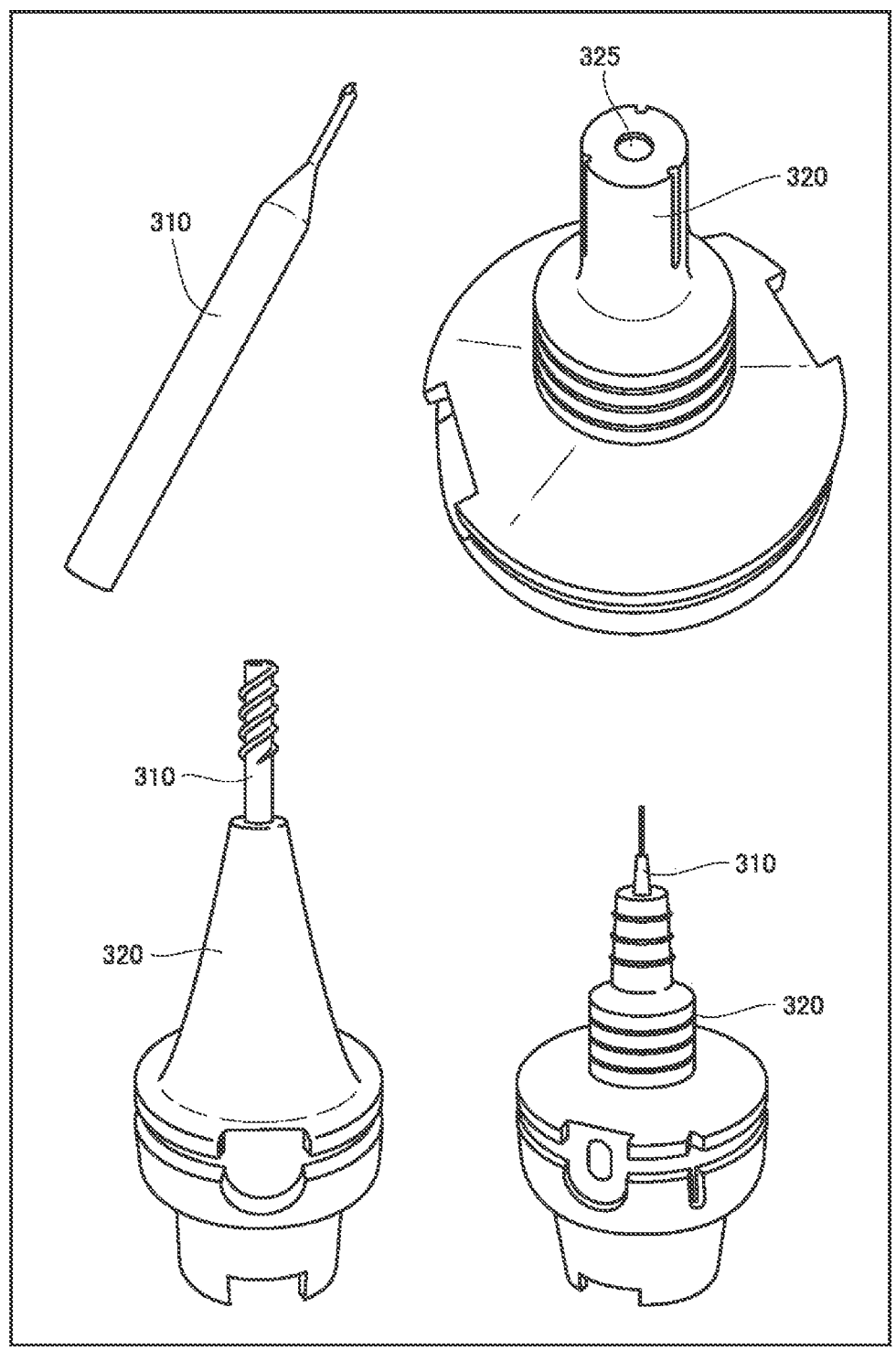
FIG. 3 is a diagram illustrating an exemplary tool 310 and an exemplary holder 320 each handled by the shrink fitting system 100 according to the embodiment.

FIG. 3 is a diagram illustrating an exemplary tool 310 and an exemplary holder 320 each handled by the shrink fitting system 100 according to the present embodiment. Referring to FIG. 3, the shapes and the like of the tool 310 and the holder 320 each handled by the shrink fitting system 100 according to the present embodiment will be described.

The tool 310 is used by the CNC processing machine with the tool 310 being inserted in the holder 320. The tool is, for example, a cutting tool, and may include an end mill, a ball mill, a drill, a face mill, a groove mill, a tap, or the like. The tool 310 can include tools having various tool diameters.

The holder 320 is held by the CNC processing machine. The CNC processing machine includes a head to which the holder 320 is attachable. The CNC processing machine can perform a wide types of processing on a member by changing the holder 320 in which various tools 310 are inserted. For the holder 320, there are holders having various shapes or types, and the holder 320 is provided with a hole 325 into which the tool 310 is insertable. A tool 310 having a diameter (diameter of an insertion portion) corresponding to the hole 325 is inserted into the holder 320.

Figure 4:
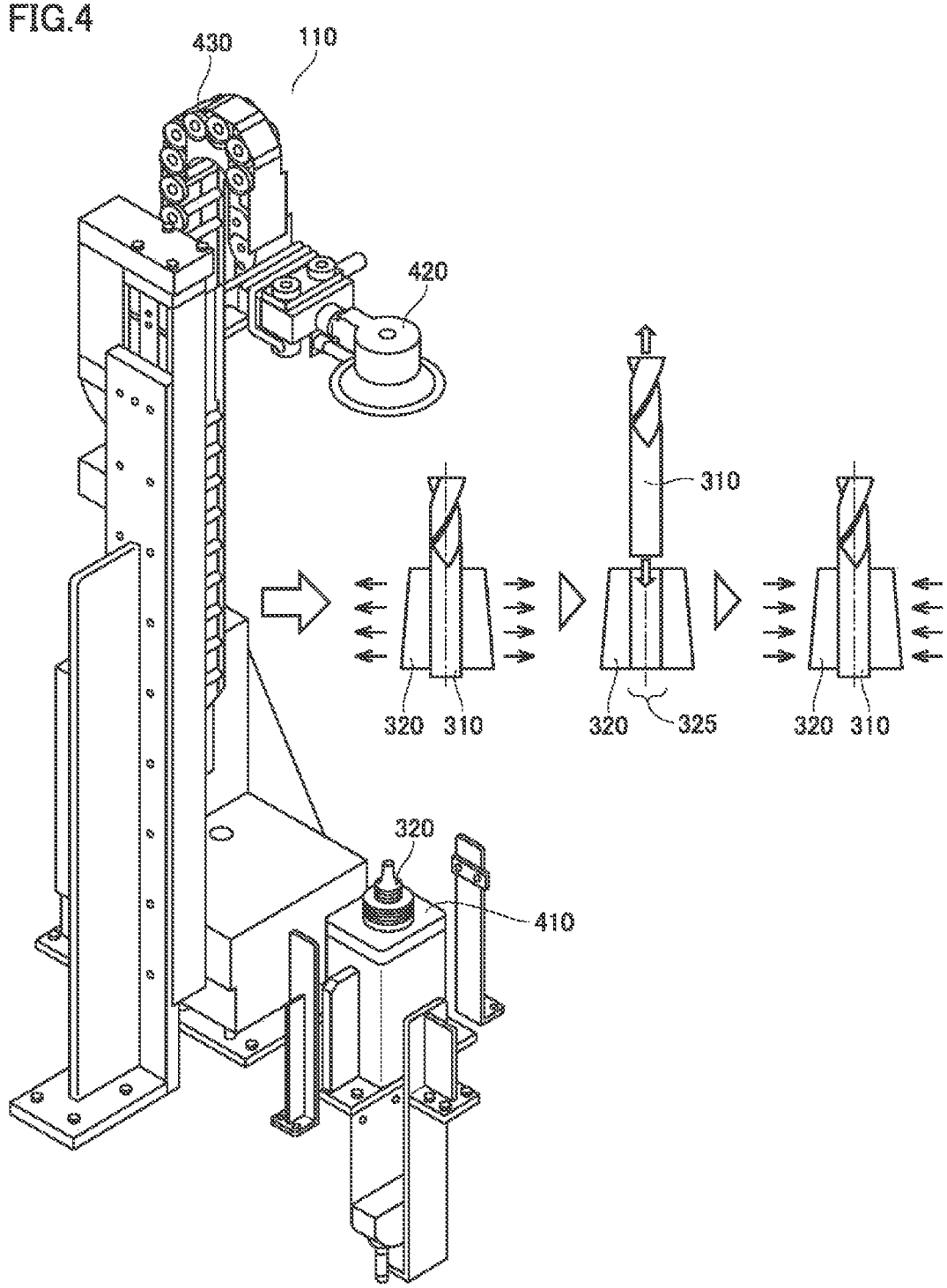
FIG. 4 is a diagram illustrating an exemplary configuration of a heating device 110 according to the embodiment.

FIG. 4 is a diagram illustrating an exemplary configuration of heating device 110 according to the present embodiment. The configuration and operation of the heating device 110 will be described with reference to FIG. 4.

The heating device 110 includes the pedestal 410, a heating section 420, and a lifting section 430. In a certain aspect, the pedestal 410 may be separated from the heating device 110. In another aspect, the pedestal 410 may be integrated with the heating device 110.

The pedestal 410 is a table for installing the holder 320 thereon. In a certain aspect, the pedestal 410 may include, on an installation surface for the holder 320, a first positioning member (not illustrated) or taper (not illustrated) for determining the installation position of the holder 320. Furthermore, in another aspect, the pedestal 410 may include a second positioning member (not illustrated) for determining an amount or position of insertion of the tool 310 into the holder 320. As an example, the second positioning member may be a protrusion that can be driven up and down inside the hole 325 of the holder 320. A driving amount of the second positioning member can be controlled by the device 900 so as to adjust the amount or position of insertion of the tool 310 into the holder 320. Further, the shrink fitting system 100 can adjust the height of the second positioning member in accordance with a type of the tool 310.

The heating section 420 heats, using a built-in heater or the like, the holder 320 installed on the pedestal 410. The heating section 420 has, for example, a shape that covers the holder 320, and can therefore sufficiently heat the holder 320. The hole 325 of the holder 320 heated by the heating section 420 is expanded. The robot 120 inserts the tool 310 into the expanded hole 325. When the holder 320 is cooled after the insertion of the tool 310, the hole 325 is shrunk, thereby fixing the tool 310.

The lifting section 430 moves the heating section 420 in the upward/downward direction. The lifting section 430 can move the heating section 420 up and down using a motor, a belt, and the like.

Figure 5:
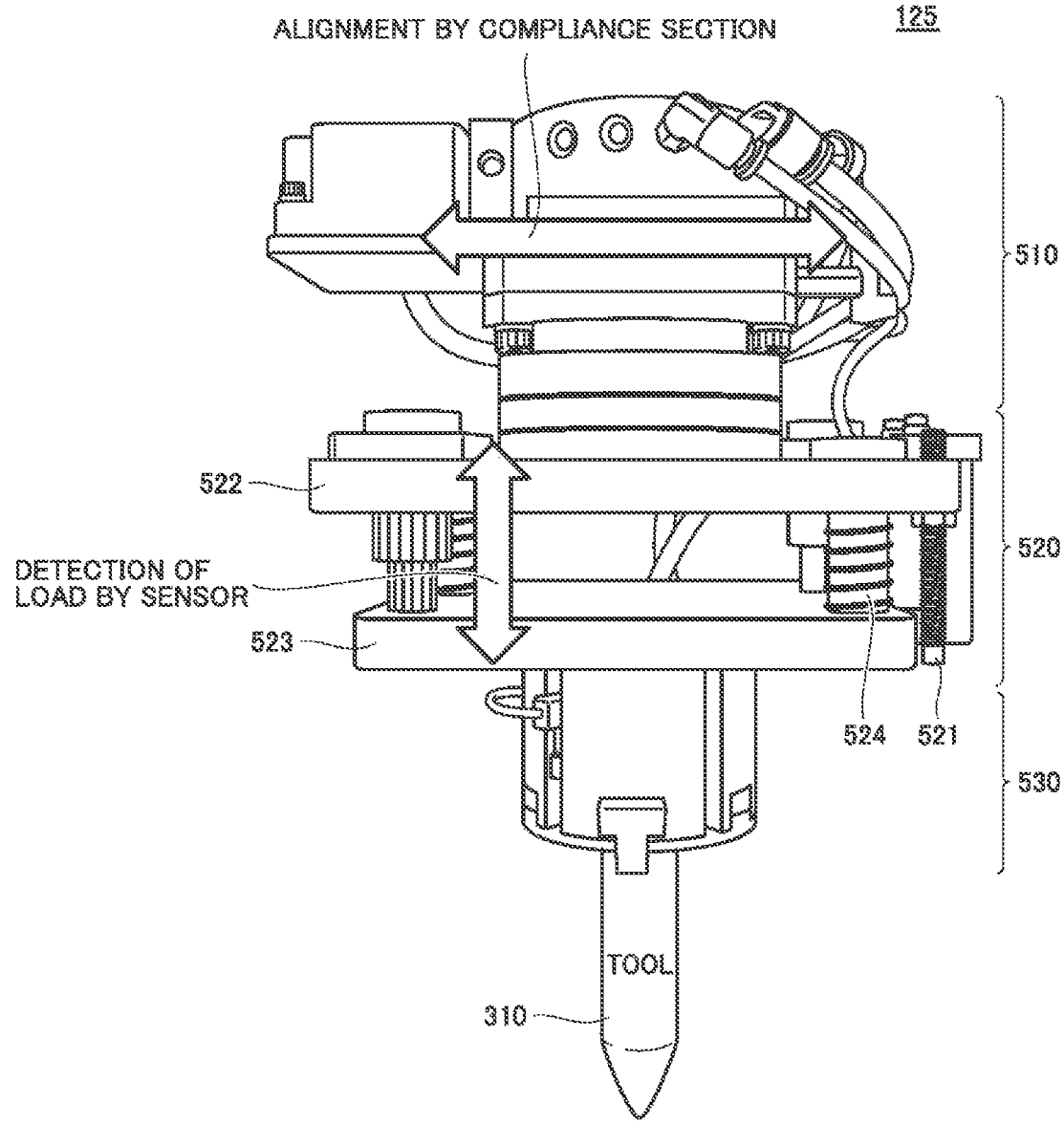
FIG. 5 is a diagram illustrating an exemplary configuration of a front end tool 125 of a robot 120 according to the embodiment.

FIG. 5 is a diagram illustrating an exemplary configuration of the front end tool 125 of the robot 120 according to the present embodiment. The configuration of the front end tool 125 of the robot 120 will be described with reference to FIG. 5.

As main configurations, the front end tool 125 includes a compliance section 510, a sensing section 520, and a grasping section 530. In a certain aspect, the front end tool 125 may further include any one or more other configurations.

The compliance section 510 is an alignment mechanism and can adjust the insertion position of the tool 310 when the center of the tool 310 is displaced from the hole 325 of the holder 320. As an example, the compliance section 510 can slide on a plane perpendicular to the insertion direction of the tool 310, thereby adjusting the insertion position of the tool 310. Since the compliance section 510 is included, the front end tool 125 can eliminate the displacement between the center of the tool 310 and the hole 325 to some extent. A manner of the operation of the compliance section 510 will be described later with reference to FIG. 8.

The sensing section 520 detects a load applied to the front end tool 125 or the robot 120. As an example, the sensing section 520 includes a first plate 522, a second plate 523, an elastic body 524, a shielding object 521 (any shielding object such as a pin), and a photo sensor 610 (see FIG. 6).

The elastic body 524 is disposed between the first plate 522 and the second plate. The elastic body 524 is shrunk in response to a pressure applied to the tool 310. Accordingly, a distance between the first plate 522 and the second plate is also reduced. When the insertion position of the tool 310 is displaced from the hole 325, the tool 310 hits against the holder 320 and accordingly receives a repulsive force. The elastic body 524 can reduces the repulsive force, thereby protecting the tool 310 and the front end tool 125.

The shielding object 521 is fixed to one of the first plate 522 and the second plate 523. Furthermore, based on the elastic body 524 being shrunk by a predetermined distance or more, the shielding object 521 is configured to block an incoming light path for the photo sensor 610 or be separated from the incoming light path for the photo sensor 610. That is, when the tool 310 receives a certain pressure or more due to displacement or the like of the insertion position of the tool 310 (when the task of insertion of the tool 310 is failed), an output signal of the photo sensor 610 is changed. By monitoring the output signal of the photo sensor 610, the device 900 can detect that the tool 310 or the front end tool 125 (robot 120) receives a certain pressure or more or that the task of insertion of the tool 310 is failed.

When it is detected that the task of insertion of the tool 310 is failed, the device 900 temporarily suspends the task of insertion of the tool 310 and separates the tool 310 from the holder 320. Then, the device 900 can perform one or a combination of adjusting the insertion position of the tool 310, re-heating the holder 320, and replacing the tool 310 to be inserted or the holder 320.

In a certain aspect, the device 900 may replace the tool 310 to be inserted or the holder 320 based on the task of insertion being not succeeded even though the task of adjusting the insertion position of the tool 310 and re-inserting the tool 310 is repeated a first number of times.

In another aspect, the device 900 may replace the tool 310 to be inserted or the holder 320 based on the task of insertion being not succeeded even though the task of re-heating the holder 320 and re-inserting is repeated a second number of times.

Further, in another aspect, the device 900 may replace the tool 310 to be inserted or the holder 320 based on the task of insertion being not succeeded even though the task of adjusting the insertion position of the tool 310, re-heating the holder 320, and re-inserting is repeated a third number of times.

The grasping section 530 is configured to grasp the tool 310. The grasping section 530 grasps the tool 310 installed on the tool table 140. After completing the determination of the insertion position of the tool 310 by the robot 120, the grasping section 530 inserts the tool 310 into the holder 320.

Figure 6:
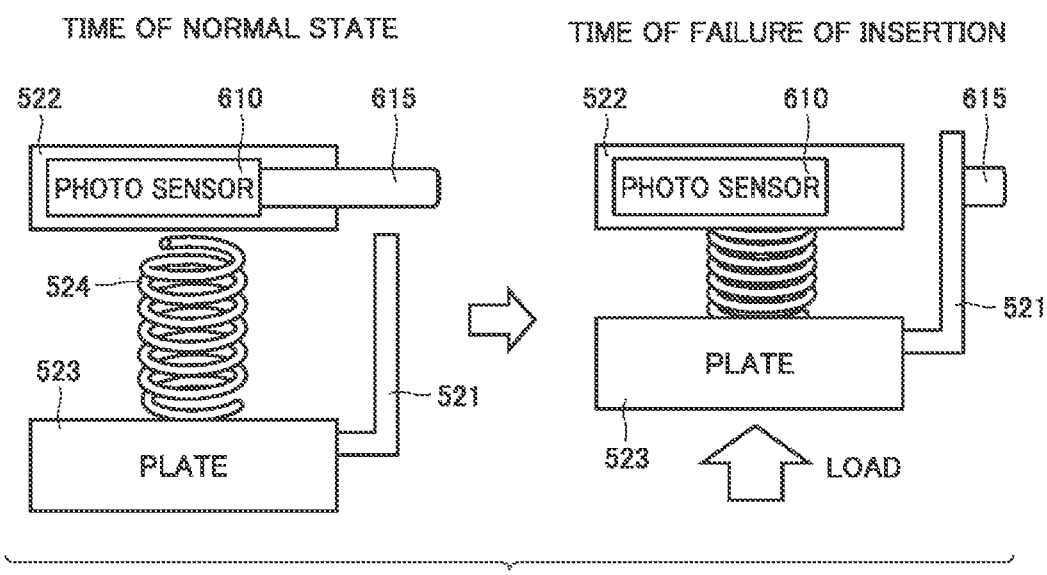
FIG. 6 is a diagram illustrating an exemplary manner of operation of a photo sensor 610 included in the front end tool 125.

FIG. 6 is a diagram illustrating an exemplary operation of the photo sensor 610 included in the front end tool 125. A mechanism for the operation of the photo sensor 610 will be described with reference to FIG. 6. In the example illustrated in FIG. 6, the shielding object 521 is fixed to the second plate 523, and does not block the incoming light path 615 for the photo sensor 610 when no pressure is applied to the elastic body 524.

At the time of a normal state (when the task of insertion of the tool 310 is succeeded), the elastic body 524 is not shrunk or is hardly shrunk. Therefore, the distance between the first plate 522 and the second plate 523 is not changed and the position of the shielding object 521 is also not changed. In the example illustrated in FIG. 6, since the shielding pin 512 does not block the incoming light path 615 for the photo sensor 610, the photo sensor 610 receives light.

At the time of the failure of the insertion (when the task of inserting the tool 310 is failed), the elastic body 524 is shrunk. Therefore, the distance between the first plate 522 and the second plate 523 is also changed. Accordingly, the position of the shielding object 521 is also changed. In the example illustrated in FIG. 6, since the shielding pin 512 blocks the incoming light path 615 for the photo sensor 610, the photo sensor 610 cannot receive light.

As described above, the photo sensor 610 can be disposed in the vicinity of the elastic body 524. Thus, the device 900 references the output signal that is output from the photo sensor 610 and that is changed based on the movement of the shielding object 521 operated in conjunction with the elastic body 524, thereby detecting that the tool 310 or the front end tool 125 (robot 120) receives a certain pressure or more, or that the task of insertion of the tool 310 is failed.

In a certain aspect, the photo sensor 610 may be configured to greatly change the output signal based on the elastic body 524 being shrunk by a predetermined distance.

In another aspect, the elastic modulus (or spring constant) of the elastic body 524 may be set to shrink the elastic body 524 by a predetermined first force or more. Further, in another aspect, the elastic modulus (or spring constant) of the elastic body 524 may be set to change the output signal of the photo sensor 610 under a predetermined second force or less. For example, the elastic modulus (or spring constant) of the elastic body 524 may be set to change the output signal of the photo sensor 610 at a timing of application, to the tool 310, of force (first force) by which the task of insertion of the tool 310 can be determined as being failed and force (second force) by which the tool 310 is not damaged or at a timing slightly before the foregoing timing. For example, the second force may be a threshold value at which the shrink fitting system 100 suspends the operation of insertion of the tool 310. Thus, the shrink fitting system 100 can detect the failure of the task of insertion of the tool 310 (or excessive force applied to the tool 310) in accordance with the output signal of the photo sensor 610 before the pressure between the tool 310 and the holder 320 becomes the predetermined force (second force).

In the example illustrated in FIG. 6, the shielding object 521 blocks the incoming light path 615 for the photo sensor 610 in response to the elastic body 524 being shrunk by a predetermined amount, but the exemplary configuration of the sensing section 520 is not limited thereto. In a certain aspect, the shielding object 521 may block the incoming light path 615 for the photo sensor 610 in a state in which the elastic body 524 is not shrunk. In this case, the shielding object 521 is separated from the incoming light path 615 for the photo sensor 610 by the elastic body 524 being shrunk by a predetermined amount.

Figure 7:
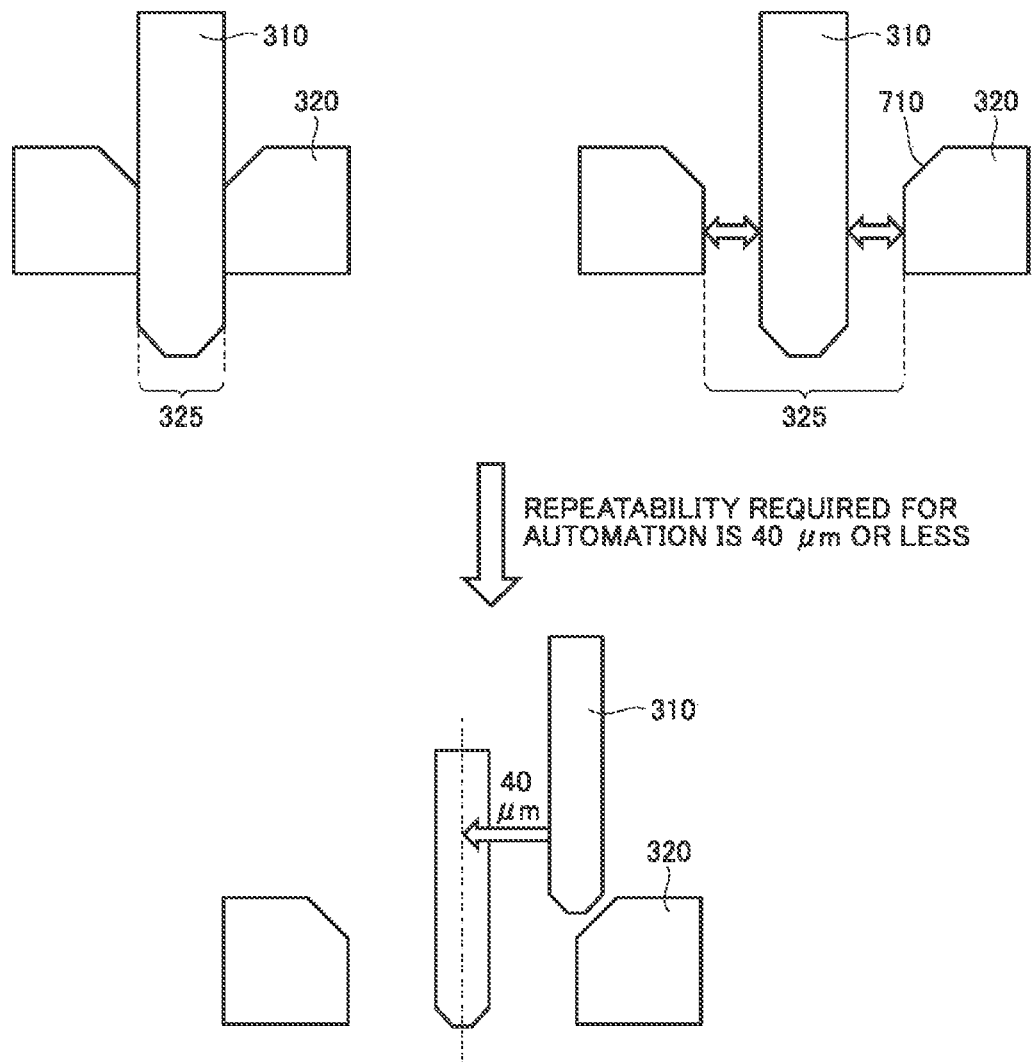
FIG. 7 is a diagram illustrating an exemplary condition for inserting the tool 310 into the holder 320.

FIG. 7 is a diagram illustrating an exemplary condition for inserting the tool 310 into the holder 320. Referring to FIG. 7, the condition for inserting the tool 310 into the holder 320 will be described.

At the time of the normal state (when the holder 320 is not heated), the tool diameter of the tool 310 and the diameter of the hole 325 of the holder 320 are substantially equal to each other. Therefore, at the time of the normal state, the robot 120 cannot insert the tool 310 into the holder 320 that is not heated.

Since the hole 325 of the holder 320 is expanded and enlarged at the time of insertion/removal (when the holder 320 is heated), the diameter of the hole 325 becomes larger than the tool diameter of the tool 310. Therefore, at the time of insertion/removal, the robot 120 can insert or remove the tool 310 into or from the holder 320 that is heated.

An edge of the hole 325 is provided with a taper 710 in order to attain insertion of the tool 310 even when the center of the hole 325 and the center of the tool 310 are displaced from each other to some extent.

However, a difference between the diameter of the hole 325 and the tool diameter of the tool 310 is only about several-ten micrometers. Therefore, even though the taper 710 is present, the robot 120 needs to repeat the determination of the insertion position of the tool 310 with very high precision (for example, an error of 40 μm).

Figure 8:
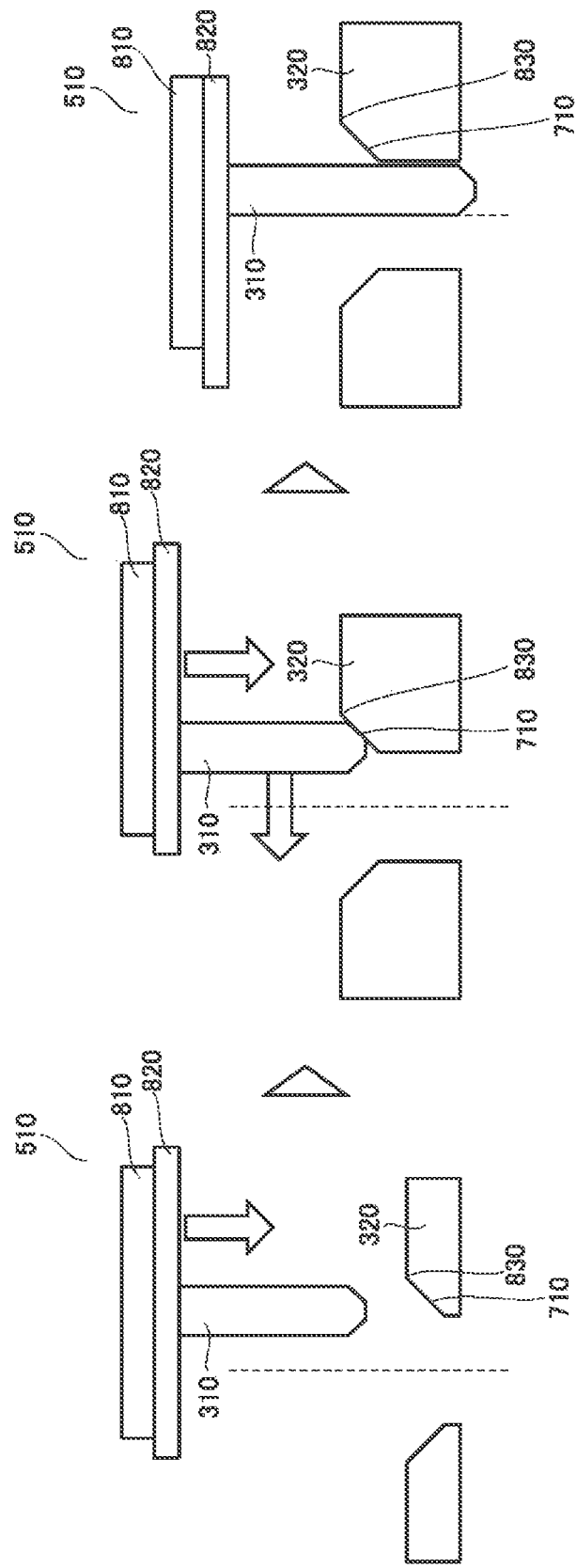
FIG. 8 is a diagram illustrating an exemplary operation image of a compliance section 510 included in the front end tool 125.

FIG. 8 is a diagram illustrating an exemplary operation image of the compliance section 510 included in the front end tool 125. The operation image of the compliance section 510 included in the front end tool 125 will be described with reference to FIG. 8.

The compliance section 510 is an alignment mechanism, and can slide on a plane perpendicular to the insertion direction of the tool 310, thereby adjusting the insertion position of the tool 310. As an example, the compliance section 510 includes a first plate 810 and a second plate 820. The second plate 820 can slide with respect to the first plate 810 (the second plate 820 may also be moved with respect to the first plate 810 in the upward/downward direction to some extent). Therefore, even when the insertion position of the tool 310 is displaced, the task of insertion can be performed as long as the center of the tool 310 is positioned on the inner side with respect to the outer periphery 830 of the taper 710. The robot 120 adjusts the insertion position to position the center of the tool 310 on the inner side with respect to the outer periphery 830 of the taper 710. Furthermore, the compliance section 510 can adjust the insertion position of the tool 310 along the taper of the tool 310 and the taper of the holder 320.

In the task of determining the insertion position of the tool 310, the shrink fitting system 100 performs the adjusting to position the center of the tool 310 on the inner side with respect to the outer periphery 830 of the taper 710 of the holder 320.

Figure 9:
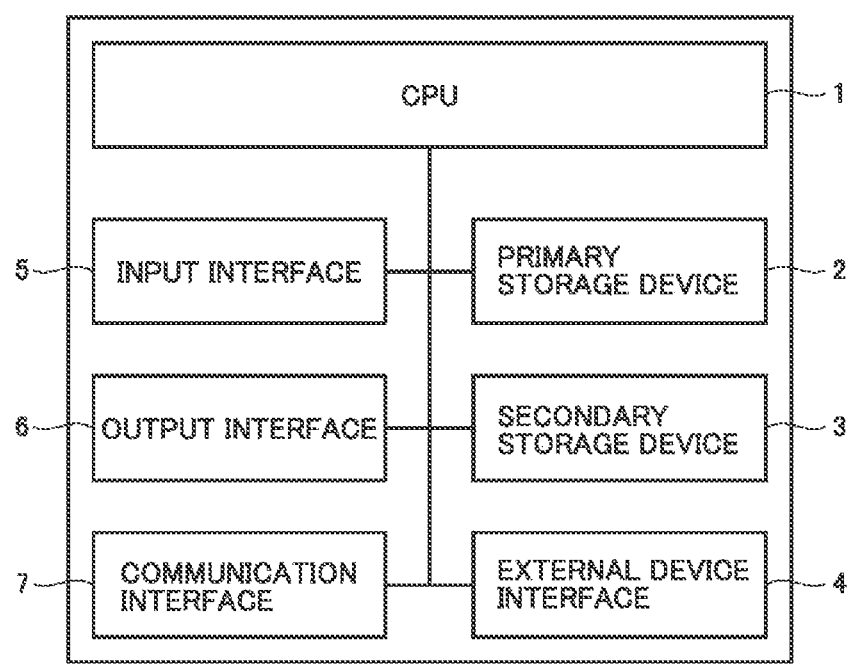
FIG. 9 is a diagram illustrating an exemplary configuration of a device 900 according to the embodiment.

FIG. 9 is a diagram illustrating an exemplary configuration of device 900 according to the present embodiment. In a certain aspect, the device 900 may be an information processing device such as a personal computer, a workstation, a server, or a virtual machine on a cloud environment, or may be a combination thereof. In another aspect, the device 900 can execute a program on hardware illustrated in FIG. 9 so as to cause the shrink fitting system 100 to perform processing illustrated in FIG. 10.

The device 900 includes a central processing unit (CPU) 1, a primary storage device 2, a secondary storage device 3, an external device interface 4, an input interface 5, an output interface 6, and a communication interface 7.

The CPU 1 can execute a program for implementing various functions of the device 900. The CPU 1 is constituted of at least one integrated circuit, for example. The integrated circuit may be constituted of, for example, at least one CPU, at least one field programmable gate array (FPGA), or a combination thereof. In a certain aspect, the device 900 may include a graphics processing unit (GPU) or an application specific integrated circuit (ASIC) each for implementing the processing of FIG. 10, instead of the CPU 1. In another aspect, the device 900 may include part or all of the CPU 1, the GPU, and the ASIC.

The primary storage device 2 stores a program to be executed by the CPU 1 and data to be referenced by the CPU 1. In a certain aspect, the primary storage device 2 may be implemented by a dynamic random access memory (DRAM), a static random access memory (SRAM), or the like.

The secondary storage device 3 is a nonvolatile memory, and may store a program to be executed by the CPU 1 and data to be referenced by the CPU 1. In that case, the CPU 1 executes the program read from the secondary storage device 3 to the primary storage device 2, and references the data read from the secondary storage device 3 to the primary storage device 2. In a certain aspect, the secondary storage device 3 may be implemented by a hard disk drive (HDD), a solid state drive (SSD), an erasable programmable read only memory (EPROM), an electrically erasable programmable read only memory (EEPROM), a flash memory, or the like.

The external device interface 4 can be connected to any external device such as a printer, a scanner, and an external HDD. In a certain aspect, the external device interface 4 may be implemented by a USB (Universal Serial Bus) terminal or the like. In a certain aspect, the external device interface 4 may be configured to communicate with the heating device 110, the robot 120, the preset tool 130, and the like. In this case, the CPU 1 can transmit a command to each device and receive various types of information from each device via the external device interface 4.

The input interface 5 can be connected to any input device such as a keyboard, a mouse, a touch pad, or a game pad. In a certain aspect, the input interface 5 may be implemented by a USB terminal, a PS/2 terminal, a Bluetooth (registered trademark) module, and the like.

The output interface 6 can be connected to any output device such as a cathode-ray tube display, a liquid crystal display, or an organic electro-luminescence (EL) display. In a certain aspect, the output interface 6 may be implemented by a USB terminal, a D-sub terminal, a digital visual interface (DVI) terminal, a high-definition multimedia interface (HDMI (registered trademark)) terminal, and the like.

The communication interface 7 is connected to a wired or wireless network hardware. In a certain aspect, the communication interface 7 may be implemented by a wired local area network (LAN) port, a wireless fidelity (Wi-Fi (registered trademark)) module, or the like. In another aspect, the communication interface 7 may transmit and receive data using a communication protocol such as TCP/IP (Transmission Control Protocol/Internet Protocol) or UDP (User Datagram Protocol). In another aspect, the communication interface 7 may be configured to communicate with the heating device 110, the robot 120, the preset tool 130, and the like. In this case, the CPU 1 can transmit a command to each device and receive various types of information from each device via the communication interface 7.

FIG. 10 is a diagram illustrating an exemplary operation sequence of the shrink fitting system 100. In a certain aspect, the CPU 1 may control the shrink fitting system 100 by reading a program for performing the processing of FIG. 10 from the secondary storage device 3 to the primary storage device 2 and by executing the program. In another aspect, part or whole of the processing may be implemented as a combination of circuit elements configured to perform the processing. It should be noted that the flow of FIG. 10 illustrates the processing until one tool 310 is inserted into the holder 320. The shrink fitting system 100 can repeatedly perform the flow illustrated in FIG. 10 whenever the robot 120 changes the tool 310.

In a step S1010, the shrink fitting system 100 inserts the tool 310 into the hole 325 of the heated holder 320. More specifically, first, the heating device 110 heats the holder 320 installed on the pedestal 410. Next, the robot 120 acquires the tool 310 from the tool table 140 and determines the insertion position of the tool 310. After the determination of the insertion position, the robot 120 inserts the tool 310 into the hole 325 of the holder 320.

In a step S1020, the shrink fitting system 100 detects an insertion load applied to the tool 310 or the front end tool 125 (robot 120). More specifically, when the elastic body 524 of the front end tool 125 is greatly shrunk due to application of the load to the tool 310, the shielding object 521 blocks the incoming light path for the photo sensor 610 or is separated from the incoming light path for the photo sensor 610. Thus, an amount of incoming light to the photo sensor 610 is changed greatly, with the result that the output signal from the photo sensor 610 is also changed. The device 900 can acquire the output signal from the photo sensor 610 and detect the insertion load based on the output signal.

In a step S1030, the shrink fitting system 100 determines whether or not the insertion load is equal to or more than a threshold value. In a certain aspect, the threshold value may be set to a load with which a failure of the task of insertion of the tool 310 can be detected and with which the shrink fitting system 100 suspends the task of insertion or may be set to a load slightly lower than the foregoing load. The shrink fitting system 100 can estimate the insertion load based on the voltage of the output signal of the photo sensor 610 or the like.

When the shrink fitting system 100 determines that the insertion load is equal to or larger than the threshold value (YES in the step S1030), the shrink fitting system 100 transitions the control to a step S1040. Otherwise (NO in the step S1030), the shrink fitting system 100 transitions the control to a step S1090.

In the step S1040, the shrink fitting system 100 suspends the operation of insertion of the tool. When the shrink fitting system 100 suspends the operation of insertion, the tool 310 is removed from the holder 320 by temporarily moving the tool 310 in the upward direction.

In a step S1050, the shrink fitting system 100 determines whether or not the number of times of insertion by the current combination of the tool 310 and the holder 320 is less than (or equal to or less than) a predetermined number of times (any N times). When the shrink fitting system 100 determines that the number of times of insertion by the current combination of the tool 310 and the holder 320 is less than the predetermined number of times (YES in the step S1050), the shrink fitting system 100 transitions the control to a step S1060. Otherwise (NO in the step S1050), the shrink fitting system 100 transitions the control to a step S1080.

In the step S1060, the shrink fitting system 100 re-heats the holder 320 with the tool 310 being grasped. The robot 120 continues to grasp the tool 310 during the heating of the holder 320. The heating device 110 heats the holder 320 for a predetermined time. On this occasion, the device 900 outputs a command for re-heating the holder 320 to the heating device 110 based on the failure of the insertion of the tool 310 into the holder 320 being detected.

In a step S1070, the shrink fitting system 100 displaces the insertion position of the tool 310 by a predetermined amount. More specifically, the shrink fitting system 100 displaces the insertion position of the tool 310 on the plane perpendicular to the insertion direction of the tool 310. It should be noted that the adjusting of the insertion position of the tool 310 may include: separating the tool 310 from the holder 320; displacing the insertion position of the tool 310 by a predetermined displacement amount; and re-inserting the tool 310 into the holder 320. On this occasion, the device 900 outputs, to the robot 120, a command for adjusting the insertion position of the tool 310, based on the failure of the insertion of the tool 310 into the holder 320 being detected.

In the step S1080, the shrink fitting system 100 returns the tool 310 to the tool table 140 and performs a task of insertion of a next tool 310. That is, when the task of insertion is not succeeded even though the processing of the steps S1060 and S1070 is repeated N−1 times (or N times), the shrink fitting system 100 determines that the tool 310 has a problem and replaces the tool 310 with another tool 310. On this occasion, the device 900 outputs, to the robot 120, a tool replacement command for replacing the tool 310, based on the failure of the insertion of the tool 310 into the holder 320 being detected.

In a certain aspect, the shrink fitting system 100 may replace, with another holder 320, the holder 320 installed on the pedestal 410. As an example, when each of the first tool and the second tool cannot be inserted into the holder 320, the shrink fitting system 100 may determine that the holder 320 has a problem and may replace the holder 320 with another holder 320. In another aspect, the shrink fitting system 100 may replace both the tool 310 and the holder 320.

In the step S1090, the shrink fitting system 100 completes the task of insertion. In a certain aspect, the shrink fitting system 100 can determine that the task of insertion is succeeded, based on the tool 310 being inserted into the holder 320 by a predetermined amount (first amount) without detecting the failure of the insertion of the tool 310 into the holder 320. In another aspect, the shrink fitting system 100 may cause free fall of the tool based on the tool 310 being inserted into the holder 320 by a predetermined amount (second amount).

As described above, the shrink fitting system 100 according to the present embodiment can continue the task of insertion without stopping the operation even when the task of insertion is failed due to the displacement of the insertion position of the tool 310. On that occasion, the shrink fitting system 100 can detect, using the front end tool 125 including the elastic body 524 and the photo sensor 610, that a predetermined amount of load is applied to the tool 310. Furthermore, the shrink fitting system 100 performs re-adjusting the insertion position of the tool 310 and re-heating the holder 320 after the failure of the task of insertion, thereby facilitating the insertion of the tool 310 into the holder 320. Thus, the shrink fitting system 100 is not stopped even when the task of shrink-fitting is failed, can automate the shrink fitting processing to attain labor saving, and can compensate for shortage of skilled artisans due to a decrease in population of workforce.

The embodiments disclosed herein are illustrative and non-restrictive in any respect. The scope of the present disclosure is defined by the terms of the claims, rather than the embodiments described above, and is intended to include any modifications within the scope and meaning equivalent to the terms of the claims. Further, it is intended that the contents of the disclosure described in the embodiment and the modification examples can be implemented solely or in combination as much as possible.

REFERENCE SIGNS LIST

1: CPU; 2: primary storage device; 3: secondary storage device; 4: external device interface; 5: input interface; 6: output interface; 7: communication interface; 100: system; 110: heating device; 120: robot; 125: front end tool; 130: preset tool; 140: tool table, 150: holder installation table; 310: tool; 320: holder; 325: hole; 410: pedestal; 420: heating section; 430: lifting section; 510: compliance section; 512: shielding pin; 520: sensing section; 521: shielding object; 522, 810: first plate; 523, 820: second plate; 524: elastic body; 530: grasping section; 610: photo sensor; 615: incoming light path; 710: taper; 830: outer periphery; 900: device.

The invention claimed is:

1. A shrink fitting system for shrink-fitting a tool to a holder, the shrink fitting system comprising:
a heater that heats the holder;
a robot that inserts the tool into the heated holder; and
a processor for the shrink fitting system, wherein
the robot includes a sensor that detects a failure of insertion of the tool into the holder,
based on the failure of the insertion of the tool into the holder being detected, the processor outputs a command for adjusting an insertion position of the tool to the robot and a command for re-heating the holder to the heater, and
wherein the processor is configured to output a command to replace the tool after the failure of the insertion of the tool into the holder, the adjusting of the insertion position of the tool, and the re-heating of the holder by the heater are each performed a predetermined plurality of times.

2. The shrink fitting system according to claim 1, wherein the robot includes an elastic portion that is shrunk in response to a pressure applied to the tool, and
the sensor is configured to change a signal to be output from the sensor, based on the elastic portion being shrunk by a predetermined distance or more.

3. The shrink fitting system according to claim 2, wherein the sensor is a photo sensor,
the robot further includes a shielding object for the sensor, and
based on the elastic portion being shrunk by the predetermined distance or more, the shielding object is configured to block an incoming light path for the sensor or be separated from the incoming light path for the sensor.

4. The shrink fitting system according to claim 2, wherein the elastic portion has an elastic modulus with which the elastic portion is shrunk at a pressure lower than a pressure at which the shrink fitting system stops an operation of the insertion of the tool.

5. The shrink fitting system according to claim 2, wherein the robot detects, by the sensor, a failure of a task of the insertion of the tool before a pressure between the tool and the holder becomes a predetermined force.

6. The shrink fitting system according to claim 2, wherein the sensor is disposed adjacent to the elastic portion.

7. The shrink fitting system according to claim 2, wherein the elastic portion has an elastic modulus that is set to change an output signal of the sensor under a predetermined first force, the predetermined first force being a force corresponding to the detection of the failure of the insertion of the tool into the holder.

8. The shrink fitting system according to claim 2, wherein
the elastic portion has an elastic modulus that is set to change an output signal of the sensor under a predetermined second force; and
the processor suspends the operation of the insertion of the tool into the holder when the predetermined second force is exceeded.

9. The shrink fitting system according to claim 1, wherein the robot includes a first plate and a second plate, the second plate being slidable with respect to the first plate to adjust the insertion position of the tool with respect to an outer periphery of the heated holder.

10. The shrink fitting system according to claim 9, wherein the robot includes a photo sensor, and a shielding object, the photo sensor being fixed to one of the first plate and the second plate, and the shielding object being fixed to an other of first plate and the second plate; and
wherein the sensor is configured to detect the failure of insertion of the tool into the holder based on the elastic portion being shrunk by the predetermined distance or more, the shielding object being configured to block an incoming light path for the sensor or be separated from the incoming light path for the sensor.

11. The shrink fitting system according to claim 1, wherein the robot is configured to suspend an operation of the insertion based on a load applied to the robot being detected by the sensor to become equal to or more than a predetermined force.

12. The shrink fitting system according to claim 1, wherein
the adjusting of the insertion position of the tool includes separating the tool from the holder,
displacing the insertion position of the tool by a predetermined displacement amount, and
re-inserting the tool into the holder.

13. The shrink fitting system according to claim 1, wherein the robot is configured to perform the adjusting to position a center of the tool on an inner side with respect to an outer periphery of a taper of the holder.

14. The shrink fitting system according to claim 13, wherein the robot includes an alignment mechanism that adjusts the insertion position of the tool along a taper of the tool and the taper of the holder.

15. The shrink fitting system according to claim 1, wherein the processor determines that a task of the insertion is succeeded, based on the tool being inserted into the holder by a first amount without detecting the failure of the insertion of the tool into the holder.

16. The shrink fitting system according to claim 15, wherein the robot causes free fall of the tool based on the tool being inserted into the holder by a second amount.

17. The shrink fitting system according to claim 16, further comprising a pedestal for the holder, wherein
the pedestal includes a first positioning member that determines a fixing position of the holder.

18. The shrink fitting system according to claim 17, wherein the pedestal further includes a second positioning member that determines the insertion position of the tool.

19. The shrink fitting system according to claim 18, wherein
the second positioning member is drivable in an insertion direction of the tool, and
the processor adjusts a height of the second positioning member in accordance with a type of the tool.

20. A shrink fitting system for shrink-fitting a tool to a holder, the shrink fitting system comprising:
a heater that heats the holder;
a robot that inserts the tool into the heated holder, the robot including a first plate, a second plate, an elastic portion, a photo sensor, and a shielding object, the photo sensor being fixed to one of the first plate and the second plate, and the shielding object being fixed to an other of first plate and the second plate; and
a computer for the shrink fitting system, wherein
the sensor is configured to detect a failure of insertion of the tool into the holder based on the elastic portion being shrunk by the predetermined distance or more, the shielding object being configured to block an incoming light path for the sensor or be separated from the incoming light path for the sensor, and
based on the failure of the insertion of the tool into the holder being detected, the computer outputs a command for adjusting an insertion position of the tool to the robot and a command for re-heating the holder to the heater, and
wherein the computer is configured to output a command to replace the tool after the failure of the insertion of the tool into the holder, the adjusting of the insertion position of the tool, and the re-heating of the holder by the heater are each performed a predetermined plurality of times.

* * * * *